(12) United States Patent
Achten et al.

(10) Patent No.: US 11,643,479 B2
(45) Date of Patent: May 9, 2023

(54) METHOD FOR PRODUCING AN ARTICLE BY LAYER-BY-LAYER BUILDUP WITH SEPARATELY PATTERNED RESIN AND INITIATOR WHEREIN THE RESIN HAS A STORAGE MODULUS GREATER THAN LOSS MODULUS AT 20 C

(71) Applicant: Covestro Deutschland AG, Leverkusen (DE)

(72) Inventors: Dirk Achten, Leverkusen (DE); Thomas Büsgen, Leverkusen (DE); Michael Ludewig, Odenthal (DE); Roland Wagner, Leverkusen (DE); Christoph Tomczyk, Leverkusen (DE); Jörg Tillack, Solingen (DE); Arnaud Guedou, Burscheid (DE)

(73) Assignee: Covestro Deutschland AG, Leverkusen (DE)

( * ) Notice: Subject to any disclaimer, the term of this patent is extended or adjusted under 35 U.S.C. 154(b) by 785 days.

(21) Appl. No.: 16/463,528

(22) PCT Filed: Dec. 4, 2017

(86) PCT No.: PCT/EP2017/081368
§ 371 (c)(1),
(2) Date: May 23, 2019

(87) PCT Pub. No.: WO2018/104225
PCT Pub. Date: Jun. 14, 2018

(65) Prior Publication Data
US 2019/0275732 A1  Sep. 12, 2019

(30) Foreign Application Priority Data
Dec. 5, 2016 (EP) .................................. 16202231

(51) Int. Cl.
*C08F 2/48* (2006.01)
*B29C 64/106* (2017.01)
(Continued)

(52) U.S. Cl.
CPC .............. *C08F 2/48* (2013.01); *B29C 64/106* (2017.08); *B33Y 70/00* (2014.12);
(Continued)

(58) Field of Classification Search
None
See application file for complete search history.

(56) References Cited

U.S. PATENT DOCUMENTS 4,337,130 A   6/1982 Ahramjian
4,663,377 A   5/1987 Hombach et al.
(Continued)

FOREIGN PATENT DOCUMENTS

CA   2898098 A1 *  8/2014   ............... A61F 2/82
CA   2898106 A1 *  8/2014   ............... A61F 2/82
(Continued)

OTHER PUBLICATIONS

CA-2898098-A1 translation (Year: 2022).*
(Continued)

*Primary Examiner* — Joseph S Del Sole
*Assistant Examiner* — Guy F Mongelli
(74) *Attorney, Agent, or Firm* — The Webb Law Firm (57) ABSTRACT

A method for producing an article in which a layer with a radically cross-linkable resin is selectively crosslinked at least partially. This takes place according to a selected cross section of the article to be formed by means of selective application of a radical initiator. The at least partially crosslinked material is added on layer by layer to a carrier or to previous layers bonded to the carrier. A system that is suitable for carrying out the method according to the inven- (Continued)

tion has a substrate, a control unit, an application unit for applying the resin to the substrate, an application unit for applying an initiator to the resin, an energy exposure unit and a contacting unit.

14 Claims, 5 Drawing Sheets

(51) Int. Cl.
    *B33Y 10/00*      (2015.01)
    *B33Y 70/00*      (2020.01)
    *B29B 17/00*      (2006.01)
    *C08F 220/34*     (2006.01)
(52) U.S. Cl.
    CPC ........... *B29B 17/0005* (2013.01); *B33Y 10/00* (2014.12); *C08F 220/343* (2020.02)

(56) References Cited

U.S. PATENT DOCUMENTS

| | | | |
|---|---|---|---|
| 5,252,696 A | | 10/1993 | Laas et al. |
| 5,510,066 A * | | 4/1996 | Fink .................. G05B 19/4099 427/427 |
| 5,945,058 A * | | 8/1999 | Manners ............... B33Y 30/00 264/401 |
| 6,191,181 B1 | | 2/2001 | Weikard et al. |
| 6,610,230 B2 * | | 8/2003 | Jiang .................. B29C 33/3857 264/161 |
| 6,942,830 B2 * | | 9/2005 | Mulhaupt ............. B29C 64/106 264/298 |
| 7,815,835 B2 | | 10/2010 | Stampfl et al. |
| 8,905,739 B2 * | | 12/2014 | Vermeer ............... B29C 64/129 425/115 |
| 9,676,963 B2 | | 6/2017 | Rolland et al. |
| 10,144,181 B2 | | 12/2018 | DeSimone et al. |
| 10,155,882 B2 | | 12/2018 | Rolland et al. |
| 11,148,320 B1 * | | 10/2021 | Sherwood ............... C08L 83/14 |
| 2002/0051830 A1 * | | 5/2002 | Takikawa ............ B29C 45/1615 425/112 |
| 2003/0143391 A1 * | | 7/2003 | Lai .......................... G02C 7/025 359/290 |
| 2004/0038009 A1 * | | 2/2004 | Leyden ................. B29C 64/165 428/206 |
| 2004/0145088 A1 * | | 7/2004 | Patel .................... B29C 41/003 264/494 |
| 2004/0237822 A1 * | | 12/2004 | Boland .................. C12M 21/08 101/483 |
| 2005/0040564 A1 * | | 2/2005 | Oliver .................... C08G 61/12 264/494 |
| 2009/0181202 A1 * | | 7/2009 | Pecorini ..................... C08J 5/00 428/36.92 |
| 2009/0304952 A1 | | 12/2009 | Kritchman |
| 2013/0302392 A1 | | 11/2013 | Mistry et al. |
| 2014/0124713 A1 * | | 5/2014 | Majumdar ............... H01L 29/45 252/514 |
| 2014/0257549 A1 * | | 9/2014 | Swartz .................. B33Y 50/02 700/119 |
| 2015/0072293 A1 | | 3/2015 | DeSimone et al. |
| 2015/0165739 A1 * | | 6/2015 | Taniuchi .............. B41J 11/0015 118/308 |
| 2015/0169802 A1 * | | 6/2015 | Suppes .................. G16C 20/10 703/2 |
| 2015/0231831 A1 * | | 8/2015 | El-Siblani .............. B33Y 30/00 264/401 |
| 2016/0046075 A1 * | | 2/2016 | DeSimone ............. B33Y 30/00 425/114 |
| 2016/0067921 A1 * | | 3/2016 | Willis ................... B29C 64/135 264/401 |
| 2016/0136889 A1 | | 5/2016 | Rolland et al. |
| 2016/0137838 A1 | | 5/2016 | Rolland et al. |
| 2016/0185045 A1 * | | 6/2016 | Linnell ................. B29C 64/379 425/162 |
| 2016/0193786 A1 * | | 7/2016 | Moore .................. B29C 64/135 425/162 |
| 2016/0288376 A1 * | | 10/2016 | Sun ........................ C08K 5/005 |
| 2016/0368806 A1 * | | 12/2016 | Yamaguchi ............. C03C 3/085 |
| 2017/0080643 A1 * | | 3/2017 | Premakumar ........... A61L 27/54 |
| 2017/0174827 A1 * | | 6/2017 | Gu ........................... A61L 27/54 |
| 2017/0182561 A1 * | | 6/2017 | Scancarello ........... B33Y 10/00 |
| 2017/0312813 A1 * | | 11/2017 | Wu ........................ B28B 7/346 |
| 2018/0009032 A1 * | | 1/2018 | Kelkar .................... B22F 3/225 |

FOREIGN PATENT DOCUMENTS

| | | | | |
|---|---|---|---|---|
| DE | 10143218 A1 | 8/2002 | | |
| DE | 102005044920 A1 | 4/2006 | | |
| EP | 0206059 A2 | 12/1986 | | |
| EP | 0540985 A1 | 5/1993 | | |
| EP | 1002818 B1 | 12/2004 | | |
| WO | WO-2007002965 A1 | 1/2007 | | |
| WO | WO-201507066 A1 | 1/2015 | | |
| WO | WO-2015187933 A1 | 12/2015 | | |
| WO | WO-2015189837 A1 * | 12/2015 | ......... B29C 48/0013 |
| WO | WO-2016071241 A1 * | 5/2016 | .......... B29C 64/112 |
| WO | WO-2016181378 A2 * | 11/2016 | .......... B29C 64/106 |

OTHER PUBLICATIONS

CA-2898106-A1 translation (Year: 2022).*
WO-2015189837-A1 translation (Year: 2022).*
WO-2016071241-A1 translation (Year: 2022).*
WO-2016181378-A2 translation (Year: 2022).*
International Search Report for PCT/EP2017/081365 dated Jan. 15, 2018.
International Search Report for PCT/EP2017/081368 dated Jan. 15, 2018.
Written Opinion of the International Searching Authority for PCT/EP2017/081365 dated Jan. 15, 2018.
Written Opinion of the International Searching Authority for PCT/EP2017/081368 dated Jan. 15, 2018.

* cited by examiner

METHOD FOR PRODUCING AN ARTICLE BY LAYER-BY-LAYER BUILDUP WITH SEPARATELY PATTERNED RESIN AND INITIATOR WHEREIN THE RESIN HAS A STORAGE MODULUS GREATER THAN LOSS MODULUS AT 20 C

CROSS-REFERENCE TO RELATED APPLICATIONS

This application is a national stage application (under 35 U.S.C. § 371) of PCT/EP2017/081368, filed Dec. 4, 2017, which claims benefit of European Application No. 16202231.3, filed Dec. 5, 2016, both of which are incorporated herein by reference in their entirety.

The present invention relates to a process for producing an article in which a layer comprising crosslinkable resin is selectively at least partially melted. This is carried out according to a selected cross section of the article to be formed. The at least partially crosslinked material is bonded ply by ply to a carrier or to preceding plies joined to the carrier. A system which is suitable for performing the process according to the invention comprises a substrate, a control unit, an application unit for the resin onto the substrate, an application unit for an initiator onto the resin, an energizing unit and a contacting unit.

Additive manufacturing processes are processes by means of which articles are constructed in layerwise fashion. They therefore differ markedly from other processes for producing articles such as milling, drilling or material removal. In the latter methods, an article is processed such that it takes on its final geometry via removal of material.

Free-radically curable resins may be employed in additive manufacturing processes. Examples of such processes are stereolithography processes. US 2015/1072293 A1 discloses an additive manufacturing process using a photopolymer in which photo-curable polyurethane compositions are considered particularly suitable materials. Such compositions contain a polyurethane based on an aliphatic diisocyanate, poly(hexamethylene isophthalate glycol) and optionally 1,4-butanediol and also a polyfunctional acrylic ester, a photoinitiator and an antioxidant. Photo-curable thermoplastic polyurethane elastomers may contain photo-reactive diacetylene diols as chain extenders.

US 2009/304952 A1 discloses an apparatus for producing three-dimensional objects comprising a tray adapted for holding an object during production; a depositing surface upon which construction materials are deposited and an inkjet printing head adapted for selectively depositing construction materials on the depositing surface in a layer according to a tomographic image. The deposited materials are combined with the object to be produced when the tray moves the article such that it contacts the deposited materials.

WO 2015/07066A1 A1 describes an additive production system for producing a three-dimensional object. A resin applicator is provided for applying a layer of a curable resin on a first side of a film substrate. The film substrate is supported by a transparent support plate and a radiation source for radiation curing of the resin layer is provided. A platform is provided for holding a stacked arrangement of one or more cured resin layers corresponding at least partially to the three-dimensional object and a positioning system is used for the relative positioning of the film substrate and the platform. A mask arranged substantially parallel to the resin layer is present and at least partially blocks incident radiation onto the resin layer according to a cross section of the article.

DE 10 2005 044920 A1 relates to a process for producing a three-dimensional article comprising the steps of—applying a liquid or pasty layer of a polymerizable resin to a target surface,—subjecting a selected portion of the layer corresponding to a cross section of the article to a jet of a polymerization initiator so that the layer undergoes polymerization and curing in the selected portion,—repeating the steps of applying and subjecting for a plurality of layers so that the joined portions of the adjacent layers join to form the article, wherein a cold-curing thermosetting polymerizable resin is used. It is especially possible to employ an unsaturated polyester resin (UP), an epoxy resin (EP), a vinyl ester resin (VE) or a vinyl ester urethane resin (VU) or the polyurethane resin (PU).

DE 10 143218 A1 discloses a system for printing three-dimensional models comprising: a bath containing a photopolymerizable resin, a printing head connected to a control means, wherein the printing head is activated to apply a photoinitiator onto a predetermined region of the photopolymerizable resin, a curing unit connected to the control means, wherein the curing unit is activated to cure the predetermined region of the resin to afford a cured polymer layer and a carrier surface connected to the control means to carry the cured layer. Also disclosed is a process for printing three-dimensional models comprising the steps of: a) filling a bath with a radiation-curable photopolymerizable resin, b) adjusting the height of a carrier surface disposed inside the bath so that the carrier surface is covered with the resin to a depth equal to the thickness of the next layer of the model to be printed, c) applying a photoinitiator in a predetermined region of the bath, d) curing the predetermined region and e) repeating the steps b-d until the model is finished.

The processes described in the prior art comprising selectively applying a photoinitiator onto a resin layer otherwise containing no initiator have the disadvantage that the design height for the article tends to be small on account of the dimensions of the resin bath (processes based on stereolithography) and that the employed resins cannot exceed a certain viscosity in order to allow the resin to flow to construct a new resin ply.

It is an object of the present invention to at least partially overcome at least one disadvantage of the prior art. It is a further object of the present invention to provide a simplified additive manufacturing process in which high viscosity resins are employable and ideally reusable. It is a further object of the invention to provide a process and a system by which articles are producible with the greatest possible resource efficiency and customization.

The object is achieved in accordance with the invention by a process as claimed in the independent claim(s). A system for performing the process is also described herein. Advantgageous developments are specified in the subsidiary claims. They may be combined with one another as desired unless the opposite is clear from the context.

A process for producing an article comprises the steps of:
I) providing a layer on a substrate, wherein the layer contains a free-radically crosslinkable resin having a viscosity (23° C., DIN EN ISO 2884-1) of ≥5 mPas to ≤100000 mPas and the layer has a composition such that under the conditions of step IV) the resin does not attain a state in which in a dynamic mechanical analysis with a plate/plate oscillation viscometer according to ISO 6721-10 at 20° C. and an angular frequency of 1/s the magnitude of the storage modulus G' is greater than or equal to the magnitude of the loss modulus G";

II) applying a composition comprising an initiator for a free-radical crosslinking of the resin onto or into the layer according to a first selected cross section of the article so that at least one crosslinkable volume comprising free-radically crosslinkable resin and initiator for a free-radical crosslinking of the resin according to the first selected cross section of the article is formed;

III) contacting the at least one crosslinkable volume formed in step II) with a carrier, IV) energizing the layer so that at least one crosslinked volume according to the first selected cross section of the article is formed from the at least one crosslinkable volume and the at least one crosslinked volume is joined to the carrier, V) removing the carrier including the at least one crosslinked volume joined to the carrier from the substrate;

VI) providing a further layer on the substrate, wherein the layer contains a free-radically crosslinkable resin having a viscosity (23° C., DIN EN ISO 2884-1) of ≥5 mPas to ≤100000 mPas and the layer has a composition such that under the conditions of step IX) the resin does not attain a state in which in a dynamic mechanical analysis with a plate/plate oscillation viscometer according to ISO 6721-10 at 20° C. and an angular frequency of 1/s the magnitude of the storage modulus G' is greater than or equal to the magnitude of the loss modulus G";

VII) applying a composition comprising an initiator for a free-radical crosslinking of the resin onto or into the layer according to a further selected cross section of the article so that at least one crosslinkable volume comprising free-radically crosslinkable resin and initiator for a free-radical crosslinking of the resin according to a further selected cross section of the article is formed;

VIII) contacting the at least one crosslinkable volume formed in step VI) with at least one crosslinked volume previously joined to the carrier (500);

IX) energizing the further layer so that at least one crosslinked volume according to the further selected cross section of the article is formed from the at least one crosslinkable volume and the at least one crosslinked volume is joined to at least one of the crosslinked volumes previously joined to the carrier, X) removing the carrier including the crosslinked volumes joined to the carrier from the substrate;

XI) repeating steps VI) to X) until the article is formed.

The process according to the invention is capable of processing free-radically crosslinkable resins having too high a viscosity for customary stereolithography or DLP processes. This unlocks new material classes for the additive manufacturing process.

The steps I) to V) in the process according to the invention relate to the construction of the first ply of the article. By contrast, steps VI) to X) relate to the construction of all further plies. The difference results from the fact that the process initially comprises a joining of the carrier to the formed crosslinked volumes and all further steps comprise joining the newly formed crosslinked volumes to previously formed crosslinked volumes adherent to the carrier.

Steps I) and VI) of the process comprise providing a layer on a substrate. The layer contains a free-radically crosslinkable resin and thus forms the construction material for the article to be produced. It is provided according to the invention that the resin has a viscosity (23° C., DIN EN ISO 2884-1) of ≥5 mPas to ≤100000 mPas and the advantages of the process according to the invention are particularly apparent at relatively high viscosities, in particular of 5000 mPas or ≥10000 mPas.

According to the inventive concept the resin layer applied in steps I) or VI) alone shall not yet be free-radically crosslinkable by energizing under the conditions of the process according to the invention. It is also provided that the layer has a composition such that under the conditions of step IV) or of step IX) the resin does not attain a state in which in a dynamic mechanical analysis with a plate/plate oscillation viscometer according to ISO 6721-10 at 20° C. and an angular frequency of 1/s the magnitude of the storage modulus G' is greater than or equal to the magnitude of the loss modulus G".

This means that under the conditions experienced by the layer as a whole and thus also the resin in the energizing steps IV) and IX)—in particular duration and intensity of energizing—the resin does not attain the gel point. In accordance with the customary definition in the art the gel point is the state in which in a dynamic-mechanical analysis (DMA) as specified hereinabove the magnitude of the storage modulus G' is equal to the magnitude of the loss modulus G". Before attaining the gel point the magnitude of the storage modulus G' is smaller than the magnitude of the loss modulus G".

This condition may be achieved for example when the layer which may contain not only the resin but also auxiliary and additive substances lacks initiators for a free-radical crosslinking. An upper limit up to which no technically significant crosslinking takes place may be for example 1 ppm based on the weight of the resin. When commercial resins to which an initiator has already been added and from which removal thereof would be excessively complex or impossible are used the inventive condition may also be met by the addition of free-radical inhibitors in an amount exceeding the amount of substance of initiators and/or in an addition amount of free-radical inhibitors such that the effectiveness of the initiators present is reduced sufficiently to ensure that the gel point is not attained upon energizing in steps IV) and/or IX). The inventive concept provides that the thus modified regions obtain the facility for crosslinking up to or beyond the gel point and thus forming a dimensionally stable volume under the conditions of the steps IV) and IX) only by spatially targeted addition of an initiator to the resin in the layer.

Steps II) and VII) comprise carrying out this spatially targeted addition of the initiator. The selecting of the respective cross section is advantageously effected by means of a CAD program, with which a model of the object to be produced has been generated. This operation is also known as "slicing" and serves as a basis for controlling the applying. The applying is preferably performed with a printing head such as is employed in inkjet printing processes. The applied composition comprising the initiator may also contain further constituents such as inert solvents or reactive diluents. The composition may be applied onto or into the layer comprising the resin, wherein applying onto the surface of the layer is preferred.

After applying the composition comprising the initiator diffuses into the layer comprising resin to form the crosslinkable volumes comprising free-radically crosslinkable resin and initiator for the free-radical crosslinking. To facilitate diffusion the viscosity (23° C., DIN EN ISO 2884-1) of the composition comprising the initiator is preferably less than the viscosity of the resin.

Steps III) and VIII) comprise contacting the crosslinkable volumes with the carrier or with previous plies of the article joined to the carrier. This contact is maintained until crosslinking of the crosslinkable volumes is complete. The contacting also creates the conditions for the detaching of the subsequently formed crosslinked volumes.

Steps IV) and IX) comprise energizing the layer which contains crosslinkable volumes and non-crosslinkable remaining regions. A free-radical crosslinking reaction proceeds in the crosslinkable volumes due to the presence of the initiator. This reaction does not occur in the remaining regions.

Steps V) and X) comprise detaching the newly formed crosslinked volumes from the carrier. In the simplest case the carrier moves vertically up and down. The surface of the carrier may be different from the surface of the substrate, wherein the adhesion of the crosslinked volume or of the volumes to the substrate is lower than to the carrier. Suitable materials for the substrate are for example materials having a low surface energy such as PTFE and fluorinated or siliconized surfaces of papers, metals or polymers. A suitable material for the carrier is for example steel, paper or a double-sided adhesive tape having a suitable adhesive layer facing the substrate. In a preferred embodiment this adhesive layer may subsequently be removed from the product by various known procedures such as washing, material-removing processes and dissolving, and in a further preferred embodiment said layer remains on the contact points of the product.

It is preferable when in step I) and/or in step VI) the thickness of the layer is $\geq 1$ μm to $\leq 1000$ μm. The thickness of the layer is preferably $\geq 10$ μm to $\leq 500$ μm, more preferably $\geq 20$ μm to $\leq 300$ μm. The resolution in the construction plane (xy plane) is preferably $\leq 50$ μm.

The process according to the invention may be performed in the normal ambient atmosphere or else in a controlled, air-conditioned atmosphere.

The solubility of the initiator in the resin and the time between application of the composition comprising initiator and energy input are advantageously adapted to one another. In a preferred embodiment the x- and y-dimension of the crosslinkable volume (when the construction direction is referred to as the z-dimension) is greater than the diameter of the applied initiator volume.

In a further preferred embodiment the z-dimension of the crosslinkable volume is smaller than the x- and y-dimension, in particular $\leq 95\%$, preferably $\leq 90\%$, particularly preferably $\leq 80\%$ and very particularly preferably $\leq 70\%$ of the layer thickness of the resin layer.

In a further preferred embodiment the composition comprising initiator is applied dropwise and the drops are applied such that a plurality of the drops already coalesces at least with one further drop on the surface of the resin layer.

In a preferred embodiment the surface tension of the resin is greater than the surface tension of the composition comprising initiator. In a particularly preferred embodiment the surface tension of the resin is $\geq 30$ mN/m and that of the composition comprising initiator is $\leq 40$ mN/m. In a particularly preferred embodiment the surface tension of the resin is $\geq 35$ mN/m and that of the composition comprising initiator is $\leq 30$ mN/m. The surface tension may be determined by contact angle measurement according to DIN 55660.

In a preferred embodiment the composition comprising initiator in conjunction with the inhibitor from the resin and/or additional specifically applied inhibitor generates a crosslinking gradient which is particularly advantageous for ply adhesion in the z-direction and in the x- and y-direction relative to the resolution is less pronounced than in the z-direction. Thus in the z-direction preference is given to a modulus gradient of $\geq 1.5$, preferably $\geq 2$, particularly preferably $\geq 3$ over a layer thickness of the crosslinked volume of $\geq 200$ micrometers, preferably $\leq 100$ micrometers, particularly preferably $\leq 50$ micrometers. In a particularly preferred embodiment the lowest layer of the crosslinked volume in a mass fraction of $\leq 30\%$, preferably $\leq 20\%$, particularly preferably $\leq 15\%$, of the total volume of the crosslinked volume has a viscosity $<10^4$ Pas and the storage modulus G' is smaller than the loss modulus G".

In a further preferred embodiment the free-radically crosslinkable resin has a viscosity (23° C., DIN EN ISO 2884-1) of $\geq 500$ mPas to $\leq 70000$ mPas. A viscosity of $\geq 1000$ mPas to $\leq 50000$ mPas is more preferred. The following combinations of viscosities (23° C., DIN EN ISO 2884-1) for a resin and a composition comprising initiator are further preferred.

Resin: $\geq 500$ mPas to $\leq 70000$ mPas and
Composition comprising initiator: $\geq 2$ mPas to $\leq 5000$ mPas Resin: $\geq 500$ mPas to $\leq 70000$ mPas and
Composition comprising initiator: $\geq 5$ mPas to $\leq 2000$ mPas, wherein the viscosity of the composition comprising initiator is less than that of the resin Resin: $\geq 1000$ mPas to $\leq 50000$ mPas and
Composition comprising initiator: $\geq 10$ mPas to $\leq 1000$ mPas Resin: $\geq 1000$ mPas to $\leq 40000$ mPas and
Composition comprising initiator: $\geq 10$ mPas to $\leq 500$ mPas, wherein the viscosity of the composition comprising initiator is less than that of the resin In a further preferred embodiment in step I) and/or step VI) the free-radically crosslinkable resin comprises functional groups selected from: vinyl, propenyl, allyl, vinyl ether, maleyl, fumaryl, maleimide, dicyclopentadienyl, acrylamide and (meth)acrylate groups or a combination of at least two of these. Preference is given to (meth)acrylate groups.

In a further preferred embodiment in step I) and/or step VI) the free-radically crosslinkable resin comprises a urethane (meth)acrylate.

In a further preferred embodiment in step I) and/or step VI) the free-radically crosslinkable resin comprises at least one isocyanate-functional compound which comprises at least one radiation-curable group selected from: vinyl, propenyl, allyl, vinyl ether, maleyl, fumaryl, maleimide, dicyclopentadienyl, acrylamide and (meth)acrylate groups or a combination of at least two of these (component A) and at least one polyol (component B). It is preferable when this free-radically crosslinkable resin further comprises an unsaturated urethane acrylate bearing no isocyanate groups (component C) and at least one (meth)acrylate component (component D).

The isocyanate-functional compounds employable according to the invention are for example constructed from polyisocyanates, wherein some of the originally present NCO groups have been reacted with hydroxy-functional compounds comprising functional groups selected from the group consisting of vinyl, propenyl, allyl, vinyl ether, maleyl, fumaryl, maleimide, dicyclopentadienyl, acrylamide and (meth)acrylate groups or a combination of at least two of these so that the isocyanate-functional compound bears vinyl, propenyl, allyl, vinyl ether, maleyl, fumaryl, maleimide, dicyclopentadienyl, acrylamide and/or (meth)acrylate groups as well as isocyanate groups.

Typically employed as polyisocyanates are aromatic, aliphatic and cycloaliphatic polyisocyanates having a number-average molecular weight of below 800 g/mol.

Suitable are for example diisocyanates from the group of 2,4-/2,6-toluene diisocyanate (TDI), methylenediphenyl diisocyanate (MDI), triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanate=IPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexylpropan, 3-isocyanatomethyl-1-methyl-1-isocyanatocyclohexane (MCI), 1,3-diisooctylcyanato-4-methylcyclohexane, 1,3-diisocyanato-2-methylcyclohexane and α,α,α',α'-tetramethyl-m- or -p-xylylene diisocyanate (TMXDI) and mixtures consisting of these compounds. Preferred starting materials for producing the isocyanate-functional compounds are hexamethylene diisocyanate (HDI), isophorone diisocyanate (IPDI) and/or 4,4'-diisocyanatodicyclohexylmethane.

Likewise suitable as polyisocyanates are reaction products of the abovementioned isocyanates with themselves or with one another to afford uretdiones or isocyanurates. Examples include Desmodur® N3300, Desmodur® N3400 or Desmodur® N3600 (all from Covestro AG, Leverkusen, Del.). Likewise suitable are derivatives of isocyanates, such as allophanates or biurets. Examples include Desmodur® N100, Desmodur® N75MPA/BA or Desmodur® VPLS2102 (all from Covestro AG, Leverkusen, Del.).

Suitable hydroxyl-containing compounds comprising radiation-curable groups are 2-hydroxyethyl (meth)acrylate, polyethylene oxide mono(meth)acrylate (for example PEA6/PEM6; Laporte Performance Chemicals Ltd., UK), polypropylene oxide mono(meth)acrylate (for example PPA6, PPM5S; Laporte Performance Chemicals Ltd., UK), polyalkylene oxide mono(meth)acrylate (for example PEM63P, Laporte Performance Chemicals Ltd., UK), poly (8-caprolactone) mono(meth)acrylates such as for example Tone Ml 00® (Dow, Schwalbach, Del.), 2-hydroxypropyl (meth)acrylate, 4-hydroxybutyl (meth)acrylate, hydroxybutylvinyl ether, 3-hydroxy-2,2-dimethylpropyl (meth)acrylate, the hydroxyl-functional mono-, di- or, if possible, higher acrylates such as for example glycerol di(meth)acrylate, trimethylolpropane di(meth)acrylat, pentaerythritol tri(meth)acrylate or dipentaerythritol penta(meth)acrylate which are obtainable by reaction of polyhdric, optionally alkoxylated alcohols such as trimethylolpropane, glycerol, pentacrythritol, dipentaerythritol.

Also employable in the urethanization reaction as such OH-functional compounds comprising radiation-curable groups are the reaction products of unsaturated acids with optionally unsaturated epoxy compounds, such as the reaction products of (meth)acrylic acid with glycidyl (meth) acrylate or bisphenol A diglycidyl ether.

The isocyanate-functional compound which comprises at least one radiation-curable group selected from the group consisting of vinyl ether, maleyl, fumaryl, maleimide, dicyclopentadienyl, acrylamide, (meth)acrylate groups or a combination of at least two of these is an isocyanate-functional urethane acrylate. Urethane acrylate is to be understood as meaning compounds comprising at least one isocyanate group and at least one acrylic group per molecule. Such systems are known per se and have the property of undergoing free-radical polymerization both via an NCO/OH reaction with polyols or polyamines and via the acrylate function by means of UV light or electron radiation. Since two different polymerization mechanisms come into play in these compounds, compositions containing such compounds are also known as "dual-cure" systems.

The isocyanate-functional urethane acrylates employable according to the invention are constructed for example from polyisocyanates, wherein some of the originally present NCO groups have been reacted with hydroxyl-functional acrylates or methacrylates so that the molecule bears terminal methacrylate groups and isocyanate groups.

Contemplated starting compounds for isocyanate-functional urethane acrylates include monomeric di- or triisocyanates. Examples of suitable monomeric polyisocyanates are 1,5-naphthylene diisocyanate, 2,2'-, 2,4- and/or 4,4'-diphenylmethane diisocyanate (MDI), hydrogenated MDI (H12MDI), xylylene diisocyanate (XDI), tetramethylxylylene diisocyanate (TMXDI), 4,4'-diphenyldimethylmethane diisocyanate, 4,4'-dibenzyl diisocyanate, 1,3-phenylene diisocyanate, 1,4-phenylene diisocyanate, tolylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), tetramethoxybutane 1,4-diisocyanate, hexane 1,6-diisocyanate (HDI), dicyclohexylmethane diisocyanate, cyclohexane 1,4-diisocyanate, ethylene diisocyanate, trimethylhexamethylene diisocyanate, 1,4-disocyanatobutane, 1,12-diisocyanatododecane, dimer fatty acid diisocyanate, or uretdiones, biurets or isocyanurates of diisocyanates. Isocyanate trimers, such as are described for example in EP 1 002 818 B1, may also be employed.

Employed hydroxyl-functional acrylates or methacrylates in principle include all conceivable compounds of this type. The compounds contain at least one monovalent hydroxyl-functional ester of (meth)acrylic acid. This is to be understood as meaning not only esters of acrylic acid or methacrylic acid with dihhydric alcohols comprising a free hydroxyl group such as for example 2-hydroxyethyl, 2- or 3-hydoxypropyl or 2-, 3- or 4-hydroxybutyl (meth)acrylate but also any desired mixtures of such compounds. Also contemplated are monohydric (meth)acryloyl-containing alcohols or reaction products consisting substantially of such alcohols obtained by esterification of n-hydric alcohols with (meth)acrylic acid, wherein employable alcohols also include mixtures of different alcohols so that n represents an integer or a statistical average of greater than 2 to 4, preferably 3, and wherein per mol of recited alcohols from (n–0.8) to (n–1.2), preferably (n–1) mol, of (meth)acrylic acid are employed. These compounds/product mixtures include for example the reaction products of glycerol, trimethylolpropane and/or pentaerythritol, of low molecular weight alkoxylation products of such alcohols, for example ethoxylated or propoxylated trimethylolpropane, for example the addition product of ethylene oxide onto trimethylolpropane having an OH number of 550 or of any desired mixtures of such at least trihydric alcohols with dihydric alcohols such as for example ethylene glycol or propylene glycol, with (ii) (meth)acrylic acid in the recited molar ratio.

Production of urethane acrylates employable according to the invention may likewise proceed from a polymeric compound selected from the group consisting of polyester (meth)acrylates, polyether (meth)acrylates, polyetherester (meth)acrylates, unsaturated polyesters having allyl ether structural units and polyepoxy (meth)acrylates. This polymeric compound forms the polymer backbone and is converted with polyisocyanates to produce the urethane acrylate. If desired the isocyanate groups of the obtained urethane acrylates may then in turn be reacted with monomeric compounds each having a hydroxyl function and at least one (meth)acrylate group, thus producing terminal acrylate groups. If only some of the isocyanate groups are converted isocyanate-functional urethane acrylates are obtained. If the isocyanate groups are completely converted an unsaturated urethane acrylate is produced.

In a particular embodiment the isocyanate-functional urethane acrylate has an NCO-functionality of 0.8 to 6, preferably 1 to 4, more preferably 1.2 to 3, very particularly preferably 1.5 to 2.5, and in particular 2.

As concerns the double bond functionality of the isocyanate-functional urethane acrylate this may vary over wide ranges. It is preferable when the double bond functionality is 0.5 to 6, preferably 1 to 4, more preferably 1.5 to 3. Double bond functionality is defined as the statistical average number of double bonds per molecule of the isocyanate-functional urethane acrylate.

The isocyanate-functional urethane acrylate further preferably has an average molecular weight of 150 to 5000 g/mol, in particular of 300 to 2500 g/mol.

This resin composition further contains at least one polyol (component B). Any polyol known in the prior art for producing polyurethane polymers for example may be used for this purpose.

Suitable polyols include in particular polyether polyols, polyester polyols, polyether polyester polyols, polycarbonate polyols, polyester carbonate polyols or polyether carbonate polyols. Further examples include aliphatic alcohols and polyols having 1-6 OH groups per molecule and 2 to about 30 carbon atoms. Suitable aliphatic polyols are for example ethylene glycol, 1,2- or 1,3-propanediol, 1,4-butanediol, 1,3-butanediol, 2,3-butanediol, 1,4-butenediol, 1,5-pentanediol, pentanediols, 1,6-hexanediol, 1,8-octanediol, dodecanediol and higher homologues, isomers and mixtures of such compounds. Likewise suitable are higher-functional alcohols such as for example glycerol, trimethylolpropane, pentaerythritol or sugar alcohols, such as sorbitol or glucose, and oligomeric ethers or reaction products with ethylene or propylene oxide. Also employable are the reaction products of low molecular weight, polyfunctional alcohols with alkylene oxides, so-called polyether polyols. The alkylene oxides preferably have two to about four carbon atoms. Suitable compounds include for example the reaction products of ethylene glycol, propylene glycol, glycerol, trimethylolethane or trimethylolpropane, pentaerythritol with ethylene oxide, propylene oxide or butylene oxide or mixtures thereof. The recited alcohols may themselves also be "dual-functional", i.e. may also comprise unsaturated double bonds and hydroxyl groups, wherein the double bond is obtainable for example by partial esterification with acrylic acid or reaction with di- or polyisocyanates and further reaction—as described hereinabove—with hydroxyl-functional double bond carriers. The molecular weight of the polyols may vary over wide ranges. The molecular weight (Mn) of the polyols is for instance 50 to 5000 g/mol (number-average molecular weight, Mn, as determinable by GPC), in particular from 150 to 2500 g/mol. Such polyols are known to those skilled in the art and commercially available.

Preferably also employed as component B) alternatively or in addition to the alcohols are further isocyanate-reactive compounds, optionally in the presence of suitable catalysts. The curing of further isocyanate-reactive compounds is effected preferably during or preferably after at least one of the steps I) to X) and is preferably thermally activated. Examples of further isocyanate-reactive compounds include amines, thiols, epoxides and acid anhydrides.

It is further preferable when the recited isocyanate-reactive compounds are reacted with known blocked isocyanates in the presence of suitable catalysts and/or under thermal activation. This includes in particular the reaction of amines with blocked isocyanate derivatives free from leaving groups such as is described in U.S. Pat. No. 9,676,963 B2.

The polyol in particular features an OH functionality of 1 to 6, preferably 1.5 to 5, more preferably 1.7 to 4, particularly preferably 1.8 to 3.5 and very particularly preferably 2.

The unsaturated urethane acrylate (component C) differs from the isocyanate-functional urethane acrylate in that it bears no free NCO groups. Similarly to the isocyanate-functional urethane acrylates the unsaturated urethane acrylates employed according to the invention are constructed from a polyfunctional isocyanate, wherein in the case of the unsaturated urethane acrylates all of the isocyanate groups have been reacted with a hydroxyl-functional acrylate or methacrylate. The alternative described hereinabove in connection with the isocyanate-functional urethane acrylates having a polymeric backbone composed of polyester (meth)acrylates, polyether (meth)acrylates, polyetherester (meth)acrylates, unsaturated polyesters having allyl ether structural units and polyepoxy(meth)acrylaten may also be used.

As concerns the polyfunctional isocyanates employable for the unsaturated urethane acrylates the compounds suitable therefor are in principle the same compounds recited hereinabove in connection with the isocyanate-functional urethane acrylates. The polyfunctional isocyanates for the unsaturated urethane acrylates are preferably selected from the aliphatic polyfunctional isocyanates. In other words an unsaturated aliphatic urethane acrylate is preferred as component C). These compounds are particularly preferred because they improve the flexibility of the composition used according to the invention after curing.

In a further embodiment of the invention the unsaturated urethane acrylate has a proportion of OH groups. The OH functionality is generally low and may be for example 0.01 to 1, preferably 0.05 to 0.8, more preferably 0.08 to 0.6, very particularly preferably 0.09 to 0.5 and in particular 0.1. These OH groups are likewise available for a reaction with NCO groups.

The unsaturated urethane acrylate further preferably has an average molecular weight of 200 to 3000, in particular of 300 to 2000.

The double bond functionality of the unsaturated urethane acrylate may vary over wide ranges. It is preferable when the double bond functionality is 1 to 6, preferably 2 to 5, more preferably 2.5 to 4.

The double bond functionality is defined as the statistical average number of double bonds per molecule of the unsaturated urethane acrylate.

The methacrylate component (component D) may be selected from aliphatic and/or aromatic methacrylates. Employable alkyl (meth)acrylates are for example linear or branched monofunctional unsaturated (meth)acrylates of non-tertiary alkyl alcohols whose alkyl groups comprise 4 to 14 and in particular 4 to 12 carbon atoms. Examples of such lower alkyl acrylates are n-butyl, n-pentyl, n-hexyl, cyclohexyl, isoheptyl, n-nonyl, n-decyl, isohexyl, isobornyl, 2-ethyloctyl, isooctyl, 2-ethylhexyl, tetrahydrofurfuryl, ethoxyethoxyethyl, phenoxyethyl, cyclotrimethlypropane, 3,3,5-trimethylcyclohexyl, t-butylcyclohexyl and t-butyl acrylates and methacrylates. Preferred alkyl acrylates are isooctyl acrylate, 2-ethylhexyl acrylate, 2-ethyloctyl acrylate, n-butyl acrylate, tetrahydrofurfuryl acrylate, isobornyl acrylate, ethoxyethoxyethyl acrylate, phenoxyethyl acrylate, 3,3,5-trimethylcyclohexyl acrylate and cyclohexyl acrylate.

According to a further preferred embodiment the component E is selected from the group comprising UV initiators, thermally activated initiators and redox initiators. Employable photoactivated initiators include for example benzoin ethers, such as benzoin methyl ether, benzoin isopropyl ether, substituted benzoin ethers such as anisoin methyl ether, acetophenones, such as 2,2-diethoxyacetophenone, substituted acetophenones such as 2,2-diethoxyacetophenone, 2,2-dimethoxy-2-phenylacetophenone and 1-phenyl-2-hydroxy-2-methyl-1-propanone, substituted alpha-ketols, such as 2-methyl-2-hydroxypropiophenone, aromatic sulphonyl chlorides and photoactive oximes such as 1-phenyl-1,1-propanedione-2-(O-ethoxycarbonyl)oxime.

Contemplated thermally activated initiators include organic peroxides, such as di-tert-butyl peroxide, benzoyl peroxide and lauryl peroxide, and 2,2'-azobis(isobutyronitrile). The usage amounts of the abovementioned initiators are known in principle to those skilled in the art and are for example about 0.01% to 8% by weight, in particular 0.5% to 5% by weight, preferably 1% to 3% by weight.

The composition may further include customary additives. Contemplated here are for example fillers, stabilizers, in particular UV stabilizers, fungicides, dyes, pigments, polymerization catalysts, plasticizers and solvents known to those skilled in the art. Employable polymerization catalysts include for example known-per-se isocyanate addition catalysts, for example triethylamine, 1,4-diazabicyclo-[2,2,2]-octane, tin dioctoate, dibutyltin dilaurate or bismuth octoate.

In a particularly preferred embodiment the free-radically crosslinkable resin contains the components in the following amounts, wherein the reported % by weight sum to 100% by weight:

component A) 10% to 79.9% by weight, in particular 15% to 75% by weight,
component B) 20% to 89.9% by weight, in particular 25% to 85% by weight,
component C) 0% to 50% by weight, in particular 15% to 30% by weight,
component D) 0% to 35% by weight, in particular 10% to 25% by weight.

In a further preferred embodiment in step III) and/or step VII) the initiator for a free-radical crosslinking of the resin is selected from: UV-activated initiators, thermally activated initiators, redox initiators and a combination of at least two of these. Employable photoactivated initiators include for example benzoin ethers, such as benzoin methyl ether, benzoin isopropyl ether, substituted benzoin ethers such as anisoin methyl ether, acetophenones, such as 2,2-diethoxyacetophenone, substituted acetophenones such as 2,2-diethoxyacetophenone, 2,2-dimethoxy-2-phenylacetophenone and 1-phenyl-2-hydroxy-2-methyl-1-propanone, substituted alpha-ketols, such as 2-methyl-2-hydroxypropiophenone, aromatic sulphonyl chlorides and photoactive oximes such as 1-phenyl-1, 1-propanedione-2-(O-ethoxycarbonyl)oxime.

Contemplated thermally activated initiators include organic peroxides, such as di-tert-butyl peroxide, benzoyl peroxide and lauryl peroxide, and 2,2'-azobis(isobutyronitrile).

In a further preferred embodiment the energizing in step IV) and/or step IX) is effected by irradiation with UV light. UV light having a wavelength of $\geq 250$ nm and $\leq 420$ nm is suitable and having a wavelength of $\geq 300$ nm and $\leq 400$ nm is particularly suitable. In a further preferred embodiment the substrate is at least partially transparent in respect of the energy energizing in step IV) and/or step IX).

In a further preferred embodiment an absorber for the energy energizing in step IV) and/or step IX) and/or an inhibitor for the free-radical crosslinking of the resin is applied adjacent to crosslinkable volumes. This makes it possible to increase the edge definition of the volumes formed.

In a further preferred embodiment the contacting in step 11I) and/or step VIII) is performed such that it comprises performing a relative movement of the carrier toward the substrate, monitoring the distance between the carrier and the substrate and/or between the carrier and the surface of the layer and interrupting the relative movement upon falling below a predetermined distance. The monitoring of the distance may be carried out for the movement of the carrier for example using ultrasound distance measurement or using calibrated distance sensors. A further falling below of the distance between the piston and the substrate or the surface of the resin layer would result in compression of the previously formed volumes which could destroy fine structures.

In a further preferred embodiment the contacting in step III) and/or step VIII) is performed such that it comprises performing a relative movement of the carrier toward the substrate, monitoring the contact pressure between the carrier and the substrate and/or between the carrier and the surface of the layer and interrupting the relative movement upon exceedance of a predetermined contact pressure. The monitoring of the contact pressure may be carried out for example by pressure measurement at the carrier. A further exceedance of the contact pressure between the carrier and the substrate or the surface of the resin layer would result in compression of the volumes previously obtained, which could destroy fine structures. The achieved average pressure over the entire contacted area may typically be between 0.001 bar and 0.01 bar.

In a further preferred embodiment the steps IV) and/or IX) are performed such that the at least one obtained crosslinked volume does not contact the substrate. This is preferably effected when in application steps II) and/or VII) the composition comprising initiator is applied in such a way that the crosslinkable volumes formed do not contact the substrate. When uncrosslinked resin is still present between the volume or volumes and the substrate the adhesion between the volume or volumes and the substrate becomes practically nonexistent. This simplifies the detaching from the substrate considerably.

In a further preferred embodiment the substrate is in the form of a movable conveyor belt having a side carrying the layer. This allows continuous or quasi-continuous operation of the process according to the invention.

In a further preferred embodiment a plurality of different free-radically crosslinkable resins are employed in the individual steps VII). This may be achieved for example by initially charging the different resins onto a conveyor belt side by side and switching back and forth between the individual resin regions in the process.

In a further preferred embodiment step I) and/or step VI) comprise providing the layer on the substrate in such a way that the provided layer including expanded edges corresponds to the selected cross section of the article. It is thus possible to coat not the entire substrate with a resin to cover the whole surface but rather only selected regions which in a further preferred embodiment coincide with the regions desired in the subsequent contacting step.

It is preferable when upon completion of the steps I) to X) the article is subjected to post-curing by further energizing, for example by means of radiation or thermally. This is particularly advantageous to complete the free-radical curing and thus minimize the proportion of possible monomeric compounds. Furthermore, in the case of a dual-cure formulation as described hereinabove this can complete the curing of isocyanate groups with alcohols more rapidly.

Also preferably employed in addition to isocyanate-based dual cure systems are any desired other dual-cure systems which in the above-described reaction sequence in a first free-radical crosslinking react to afford interpenetrating networks joined at at least one site.

The present invention further relates to a system for performing the process according to the invention comprising:
  a control unit;
  a substrate;
  a first application unit for providing a layer on a substrate, wherein the layer contains a free-radically crosslinkable resin having a viscosity (23° C., DIN EN ISO 2884-1) of ≥5 mPas to ≤100000 mPas and the layer has a composition such that under the conditions of step IV) and/or VIII) of the process according to the invention the resin does not attain a state in which in a dynamic mechanical analysis with a plate/plate oscillation viscometer according to ISO 6721-10 at 20° C. and an angular frequency of 1/s the magnitude of the storage modulus G' is greater than or equal to the magnitude of the loss modulus G";
  a second application unit for applying a composition comprising an initiator for a free-radical crosslinking of the resin according to a selected cross section of the article onto or into the layer;
  an energizing unit for energizing at least the portion of the layer which contains the initiator for the free-radical crosslinking of the resin;
  a contacting unit for contacting volumes free-radically crosslinked via the energizing unit and for removing these volumes from the substrate;
  wherein the second application unit performs the applying under instruction from the control unit and the contacting unit performs the contacting under instruction from the control unit.

In a preferred embodiment the substrate is in the form of a movable conveyor belt having a side carrying a layer comprising the free-radically crosslinkable resin and this side has a movement direction, the energizing unit is in the form of an irradiation unit, the second application unit is arranged upstream of the energizing unit in the movement direction of the substrate and the energizing unit is arranged opposite the contacting unit in respect of the substrate.

Such a configuration may be employed in continuous or quasi-continuous operation. In quasi-continuous operation the conveyor belt may be stopped for the radiation and contacting steps and resumed upon completion of these steps. Continuous operation can be achieved by movable irradiation and contacting units which move at the same speed and in the same direction as the conveyor belt during the irradiation and contacting steps.

In a preferred embodiment of the described invention ≥60%, preferably ≥70%, preferably ≥80%, particularly preferably ≥90%, of the employed resin may be reused since it is exposed to a markedly lower and shorter thermal stress and/or radiation stress than in classical digital light processing (DLP) and stereolithography (SLA) processes and contains no initiator for a free-radical crosslinking.

In a preferred embodiment the procedure may be performed in ambient air since oxidative processes are much less relevant due to the shorter thermal stress and accordingly discoloration and other unwanted alteration of the material occurs to a much lesser extent.

The present invention is more particularly elucidated with reference to the figures which follow without, however, being limited thereto.

Figure 1:
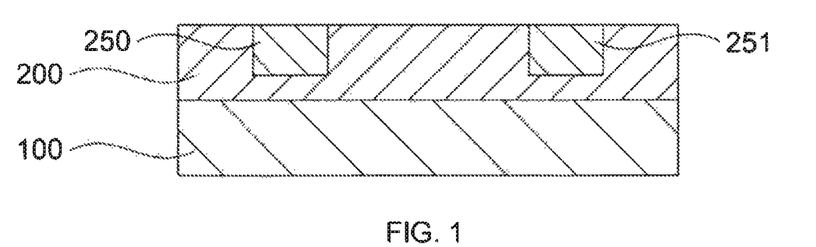
FIGS. 1-10 show the steps of the process according to the invention

FIG. 1 is a schematic diagram of the state after step II) of the process according to the invention in which the construction of the first layer of the article to be produced is initiated. A layer comprising a radically crosslinkable resin 200 is applied to a substrate 100 according to step I). This may comprise application of the resin by blade coating. The resin has a viscosity (23° C., DIN EN ISO 2884-1) of ≥5 mPas to ≤100000 mPas and as described above is selected such that under the conditions of step IV) it does not attain or exceed the gel point.

Subsequently according to step II), as shown in FIG. 1, a composition comprising initiator is applied onto the resin layer 100 according to a first selected cross section of the article. This composition diffuses into the resin layer 200 and thus forms the crosslinkable volumes 250 and 251. The composition comprising initiator is applied such that the formed crosslinkable volumes 250 and 251 do not contact the substrate 100.

Figure 2:
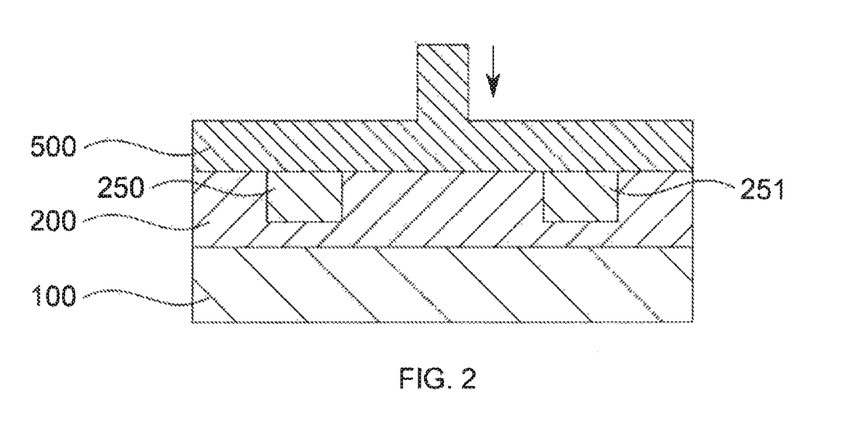

FIG. 2 shows the contacting of the crosslinkable volumes 250 and 251 with the carrier 500 (step II)) where the carrier moves downward in the direction of the substrate 100. The carrier likewise contacts the remaining surface of the resin layer 200. However this is harmless since free-radical crosslinking of the resin and thus adherence to the carrier 500 cannot occur at these sites.

Figure 3:
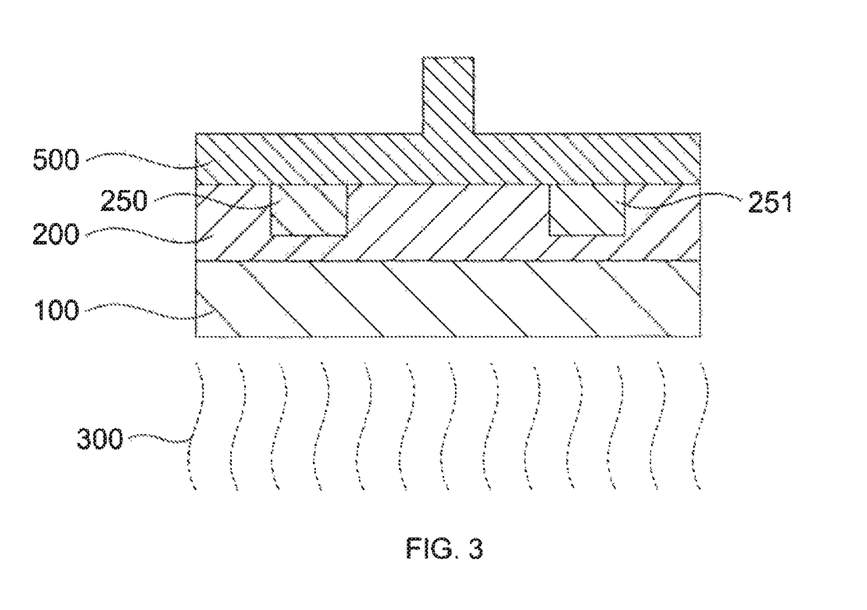

In the next step IV) of the process the resin layer 200 including the crosslinkable volumes 250 and 250 are exposed to the energy shown in FIG. 3 as UV light beams 300. The light source (not shown) for the light beams 300 is located on the side of the substrate 100 facing away from the resin layer 200. In order that the light rays 300 can reach the crosslinkable volumes 250 and 251 the substrate 100 is sufficiently transparent.

Figure 4:
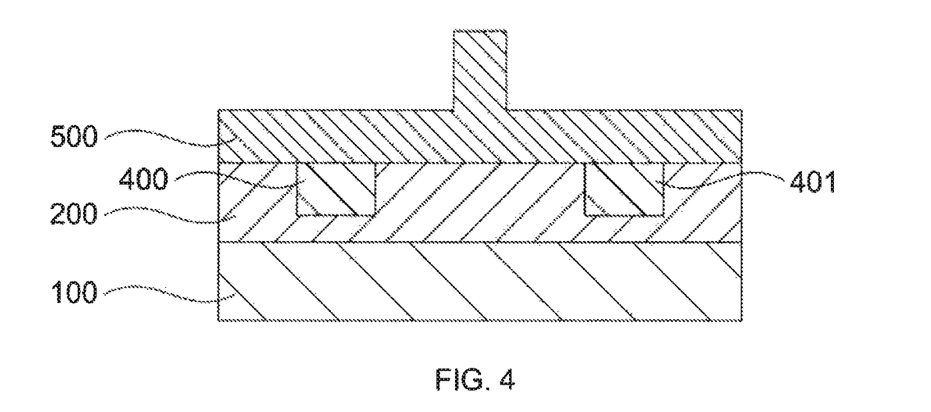

The energizing by the UV light beams forms the crosslinked volumes 400 and 401 from the crosslinkable volumes 250 and 251. Where no initiator had been applied to the resin layer in the previous steps, no crosslinking in the resin layer 200 occurred. The crosslinked volumes 400 and 401 adhere to the carrier 500. This is shown in FIG. 4.

Figure 5:
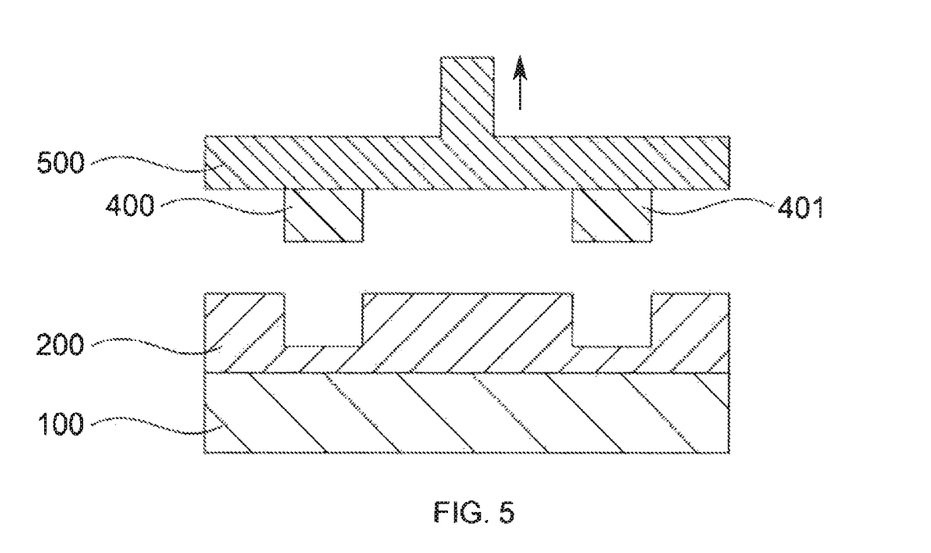

In step V) of the process/FIG. 5 the carrier 500, including the crosslinked volumes joined thereto, is removed from the substrate 500. In the case shown in FIG. 5 the carrier 500 is moved away upward. Since the crosslinkable volumes 250 and 251 did not contact the substrate in the previous steps the crosslinked volumes 400 and 401 are not adherent to the substrate 100. The carrier 500, including the crosslinked volumes 400 and 401, may then be moved away from the substrate without issue.

Once the first cross sectional ply of the article to be formed has been applied to the carrier 500 further plies may be joined to one another until the article to be formed is complete. These steps are shown in FIG. 6 to 10.

Figure 6:
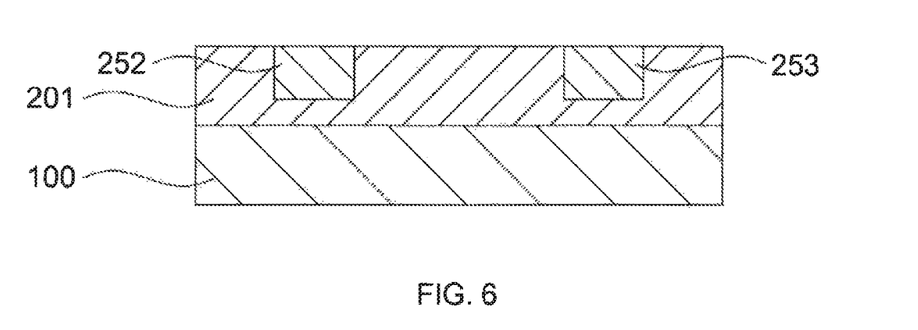

According to FIG. 6/step VI) a new complete resin layer 201 is initially provided on the substrate 100, for example again by blade coating. The resin has a viscosity (23° C., DIN EN ISO 2884-1) of ≥5 mPas to ≤100000 mPas and as described above is selected such that under the conditions of step IX) it does not attain or exceed the gel point. Then, according to step VII), a composition comprising initiator is once again applied to the resin layer 100 according to a further selected cross section of the article. This composition diffuses into the resin layer 201 and thus forms the crosslinkable volumes 252 and 253. The composition comprising initiator is applied such that the formed crosslinkable volumes 252 and 253 do not contact the substrate 100.

Figure 7:
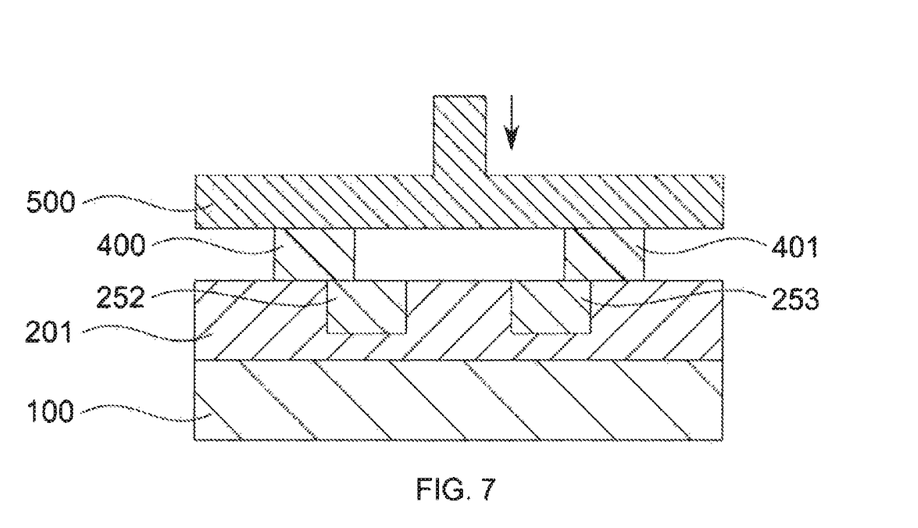

In FIG. 7/step VIII) the carrier 500 is again lowered in the direction of the substrate 100 until the previously formed crosslinked volumes 400 and 401 contact the new crosslinkable volumes 252 and 253.

Figure 8:
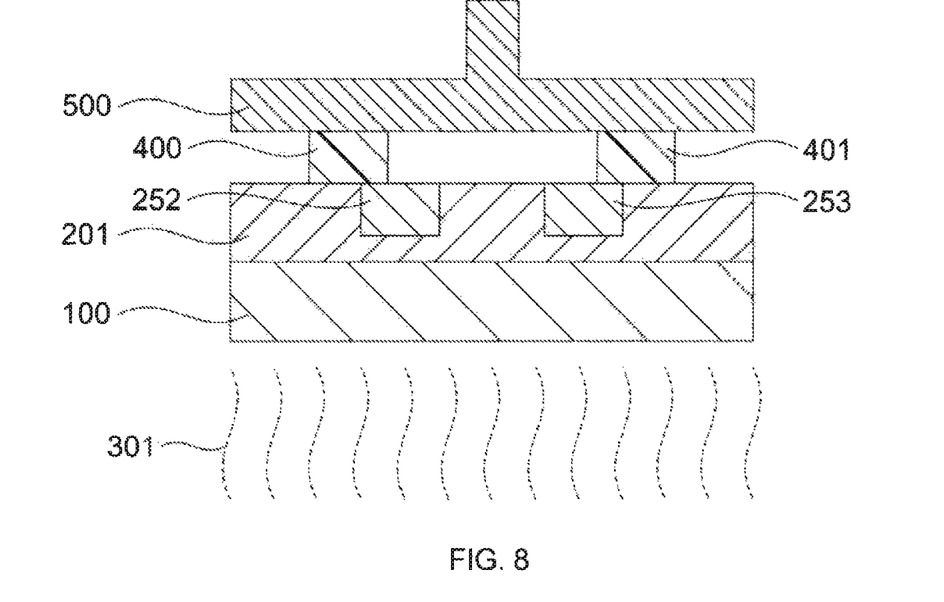
Figure 9:
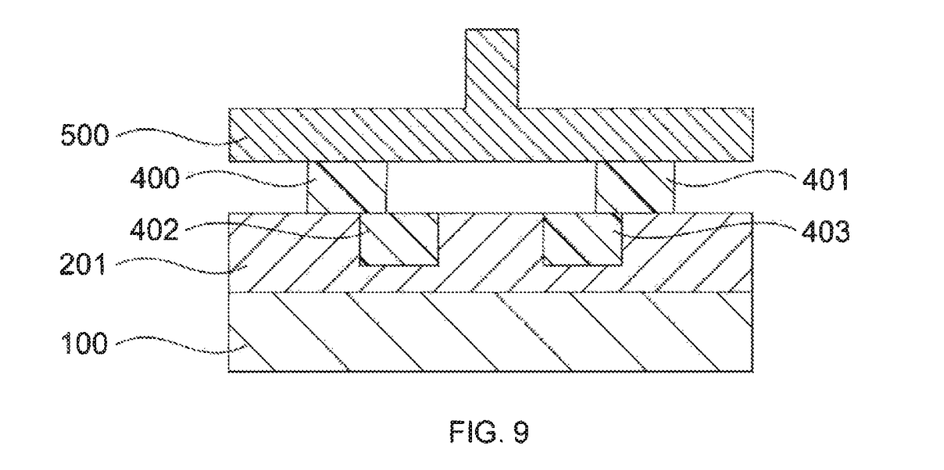

The crosslinking of the volumes 252 and 253 by energizing with UV light 301 according to step IX) is shown in FIG. 8. The newly formed crosslinked volumes 402 and 403 (FIG. 9) are joined to the previously formed volumes 400 and 401 on account of the contacting before their crosslinking.

Figure 10:
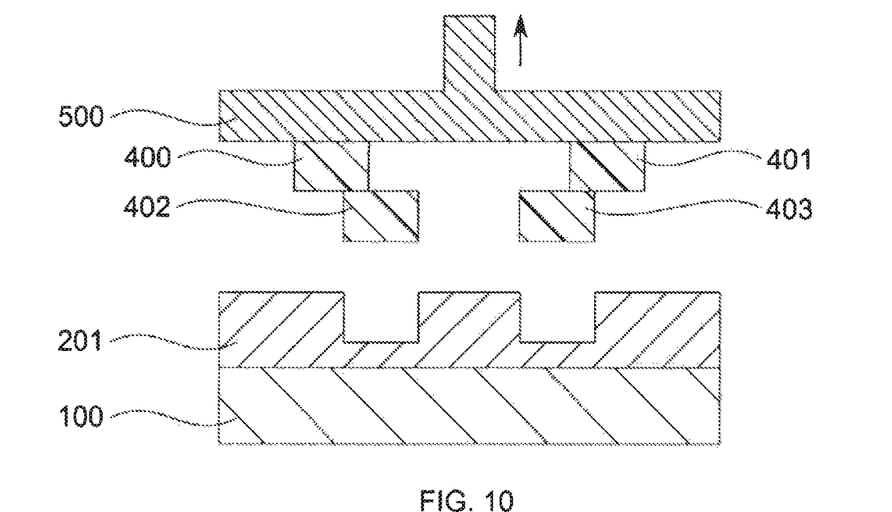

In step X) of the process/FIG. 10 the carrier 500, including the crosslinked volumes joined thereto, is removed from the substrate 100. Since the crosslinkable volumes 252 and 253 did not contact the substrate in the previous steps the crosslinked volumes 402 and 403 are not adherent to the substrate 100. The carrier 500, including the construct comprising crosslinked volumes 400, 401, 402 and 403, may then be moved away from the substrate without issue.

Figure 11:
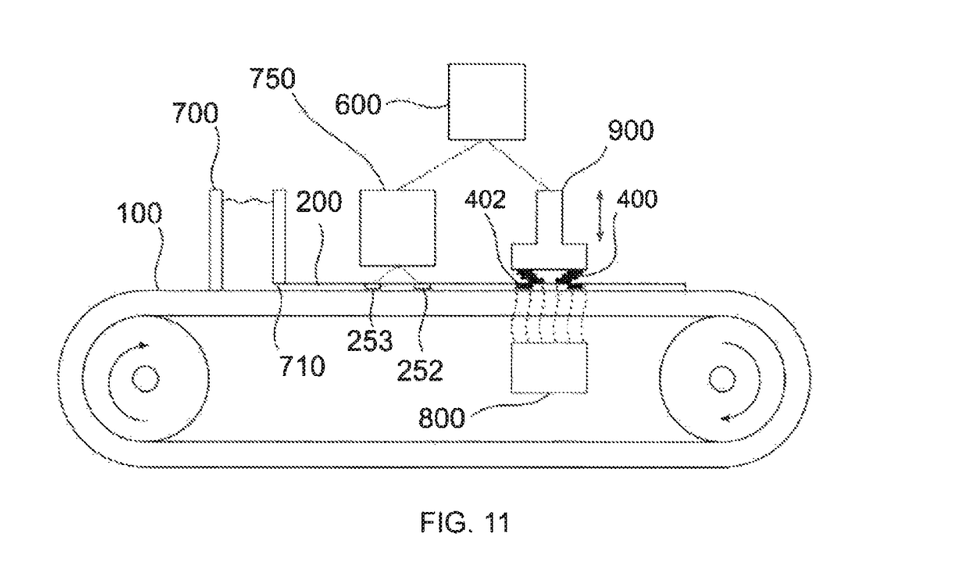
FIG. 11 shows a system according to the invention

FIG. 11 shows a system according to the invention. In the system the substrate 100 is in the form of a movable recirculating conveyor belt. The movement direction of the upward-facing side of the substrate 100 is from left to right in the figure.

The first application unit 700 also serves as a reservoir vessel for the free-radically crosslinkable resin. Via a slot 710 the resin reaches the moving substrate 100 and thus forms the resin layer 200.

The height of the slot 710 can be used to control the height of the resin layer.

The second application unit 705 under instruction of commands from the control unit 600 applies a composition comprising an initiator for a free-radical crosslinking of the resin onto the resin layer 200. This forms, after the diffusion of the initiator into the resin, the crosslinkable volumes 252 and 253.

The movement of the substrate 100 causes these crosslinkable volumes to be transported further until they arrive between the energizing unit 800 in the form of a UV irradiation unit and the contacting unit 900. The bidirectional flow of commands and control data is represented by the dashed line between the control unit 600 and the irradiation unit 800 and contacting unit 900. The contacting unit contains not only control electronics and drive means for movement but also a carrier labelled with the reference numeral 500 in FIG. 1 to 10. For clarity, said carrier has not been especially shown in FIG. 11.

In response to commands from the control unit 600 the contacting unit 900 in the form of a piston can move up and down and thus contact the crosslinkable volumes disposed below it. When the crosslinkable volumes below the contacting unit 900 have been reached, the contacting unit 900 moves downward at least with the parts intended for contacting such as a carrier.

The contacting of the crosslinkable volumes with previously formed volumes 400 as shown here is followed by an irradiation of the resin by the irradiation unit 800. Newly formed crosslinked volumes 400 adhere to previously formed volumes and may be removed from the substrate in an upwards movement of the contacting unit 900.

The proportions of the resin layer 200 not provided with an initiator may be transported into a collection container by the movement of the substrate 100, optionally in combination with a doctor blade (not shown). The resin may then be sent back for reuse, optionally after a filtration process to separate out clumped proportions, in particular by transferal into the application unit 700.

The invention claimed is:

1. A process for producing an article comprising the steps of:
   I) providing a layer on a substrate, wherein the layer contains a free-radically crosslinkable resin having a viscosity of ≥5 millipascal-seconds (mPas) to ≤100000 mPas at 23° C. and the layer has a composition such that under the conditions of step IV) the resin does not attain a state in which in a dynamic mechanical analysis with a plate/plate oscillation viscometer at 20° C. and an angular frequency of 1/s the magnitude of the storage modulus G' is greater than or equal to the magnitude of the loss modulus G";
   II) selectively applying a composition comprising an initiator for free-radical crosslinking of the resin onto or into the layer according to a first selected cross section of the article so that at least one crosslinkable volume is formed, the at least one crosslinkable volume comprising free-radically crosslinkable resin and initiator;
   III) contacting the at least one crosslinkable volume formed in step II) with a carrier;
   IV) energizing the layer so that at least one crosslinked volume according to the first selected cross section of the article is formed from the at least one crosslinkable volume and the at least one crosslinked volume is joined to the carrier;
   V) removing the carrier including the at least one crosslinked volume joined to the carrier from the substrate;
   VI) providing a further layer on the substrate, wherein the further layer contains a free-radically crosslinkable resin having a viscosity of ≥5 mPas to ≤100000 mPas at 23° C. and the further layer has a composition such that under the conditions of step IX) the resin does not attain a state in which in a dynamic mechanical analysis with a plate/plate oscillation viscometer at 20° C. and an angular frequency of 1/s the magnitude of the storage modulus G' is greater than or equal to the magnitude of the loss modulus G";
   VII) selectively applying a composition comprising an initiator fora free-radical crosslinking of the resin onto or into the further layer according to a further selected cross section of the article so that at least one crosslinkable volume is formed, the at least one crosslinkable volume comprising free-radically crosslinkable resin and initiator;
   VIII) contacting the at least one crosslinkable volume formed in step VI) with at least one crosslinked volume previously joined to the carrier;
   IX) energizing the further layer so that at least one crosslinked volume according to the further selected cross section of the article is formed from the at least one crosslinkable volume and the at least one crosslinked volume is joined to at least one of the crosslinked volumes previously joined to the carrier;
   X) removing the carrier including the crosslinked volumes joined to the carrier from the substrate;
   XI) repeating steps VI) to X) until the article is formed.

2. The process as claimed in claim 1, wherein the free-radically crosslinkable resin has a viscosity of ≥500 mPas to ≤70000 mPas at 23° C.

3. The process as claimed in claim 1, wherein in step I) and/or step VI) the free-radically crosslinkable resin comprises functional groups selected from vinyl, propenyl, allyl, vinyl ether, maleyl, fumaryl, maleimide, dicyclopentadienyl, acrylamide and (meth)acrylate groups or a combination of at least two of these.

4. The process as claimed in claim 3, wherein in step I) and/or step VI) the free-radically crosslinkable resin comprises a urethane (meth)acrylate.

5. The process as claimed in claim 3, wherein in step I) and/or step VI) the free-radically crosslinkable resin comprises at least one isocyanate-functional compound which comprises at least one radiation-curable group selected from: vinyl, propenyl, allyl, vinyl ether, maleyl, fumaryl, maleimide, dicyclopentadienyl, acrylamide and (meth)acrylate groups or a combination of at least two of these (component A) and at least one polyol (component B).

6. The process as claimed in claim 1, wherein in step II) and/or step VII) the initiator for a free-radical crosslinking of the resin is selected from: UV-activated initiators, thermally activated initiators, redox initiators and a combination of at least two of these.

7. The process as claimed in claim 1, wherein the energizing in step IV) and/or step IX) is effected by irradiation with UV light.

8. The process as claimed in claim 1, wherein the substrate is at least partially transparent in respect of the energy used for energizing in step IV) and/or step IX).

9. The process as claimed in claim 1, wherein an absorber for the energy energizing in step IV) and/or step IX) and/or an inhibitor for the free-radical crosslinking of the resin is applied adjacent to crosslinkable volumes.

10. The process as claimed in claim 1, wherein the contacting in step III) and/or step VIII) is performed such that it comprises performing a relative movement of the carrier toward the substrate, monitoring the distance between the carrier and the substrate and/or between the carrier and the surface of the layer and interrupting the relative movement upon falling below a predetermined distance.

11. The process as claimed in claim 1, wherein the contacting in step III) and/or step VIII) is performed such that it comprises performing a relative movement of the carrier toward the substrate, monitoring the contact pressure between the carrier and the substrate and/or between the carrier and the surface of the layer and interrupting the relative movement upon exceedance of a predetermined contact pressure.

12. The process as claimed in claim 1, wherein the steps IV) and/or IX) are performed such that the at least one obtained crosslinked volume does not contact the substrate.

13. The process as claimed in claim 1, wherein the substrate is in the form of a movable conveyor belt having a side carrying the layer.

14. The process as claimed in claim 1, wherein a plurality of different free-radically crosslinkable resins are employed in the individual steps VII).

* * * * *